United States Patent
Wang et al.

(10) Patent No.: US 9,712,643 B2
(45) Date of Patent: Jul. 18, 2017

(54) METHOD AND DEVICE FOR CALLING A TAXI

(71) Applicant: Xiaomi Inc., Beijing (CN)

(72) Inventors: Xin Wang, Beijing (CN); Zhenyu Yang, Beijing (CN); Tong Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/221,186

(22) Filed: Jul. 27, 2016

(65) Prior Publication Data

US 2017/0126837 A1    May 4, 2017

(30) Foreign Application Priority Data

Oct. 30, 2015   (CN) .......................... 2015 1 0727016

(51) Int. Cl.
*H04W 24/00*   (2009.01)
*H04L 29/08*   (2006.01)
(Continued)

(52) U.S. Cl.
CPC ............. *H04L 67/32* (2013.01); *H04W 4/025* (2013.01); *H04W 8/22* (2013.01)

(58) Field of Classification Search
CPC .... G06Q 50/30; G06Q 10/02; G06Q 30/0611; G06Q 10/08345; G06Q 10/0838;
(Continued)

(56) References Cited

U.S. PATENT DOCUMENTS

2011/0090078 A1   4/2011   Kim et al.
2012/0041675 A1*  2/2012   Juliver ................... G06Q 10/08
                                                          701/465
(Continued)

FOREIGN PATENT DOCUMENTS

CN    104599217 A    5/2015
CN    104796856 A    7/2015
(Continued)

OTHER PUBLICATIONS

International Search Report dated Jul. 15, 2016 for International Application No. PCT/CN2015/099407, 4 pages.
(Continued)

*Primary Examiner* — Kwasi Karikari
(74) *Attorney, Agent, or Firm* — Brinks Gilson & Lione

(57) ABSTRACT

The present disclosure relates to methods and devices for calling a taxi. A method may include determining whether a user should call a taxi, based on at least one of schedule data or schedule data. The method may further include, when it is determined that the user should call a taxi, generating and outputting a taxi calling order. In the present disclosure, a terminal device can automatically generate and output a taxi calling order when it determines that the user should call a taxi. The method or terminal can thereby initiate a taxi calling service as early as possible, and thus avoid delaying the user's schedule. Moreover, a process may require no user initiation and little or no intervention from the user. Thus, the method or terminal can simplify user operation and save the user's time.

20 Claims, 4 Drawing Sheets

(51) Int. Cl.
*H04W 4/02* (2009.01)
*H04W 8/22* (2009.01)

(58) Field of Classification Search
CPC ............... G06Q 50/32; G06Q 10/0631; G06Q 10/063114; G06Q 10/0834; G06Q 30/04; G06Q 10/1095; G06Q 20/14; G06Q 30/0256; G06Q 30/0629
USPC ....................................................... 455/456.1
See application file for complete search history.

(56) References Cited

U.S. PATENT DOCUMENTS

| | | | |
|---|---|---|---|
| 2013/0046788 A1 | 2/2013 | Goldstein et al. | |
| 2015/0310434 A1* | 10/2015 | Cheung | G06Q 20/12 705/44 |
| 2015/0323331 A1* | 11/2015 | Lord | G01C 21/3423 701/410 |
| 2015/0339928 A1* | 11/2015 | Ramanujam | G06Q 10/00 701/23 |
| 2016/0364824 A1* | 12/2016 | Bryant | G06Q 10/063114 |

FOREIGN PATENT DOCUMENTS

| | | |
|---|---|---|
| CN | 105279957 A | 1/2016 |
| KR | 10-2009-0070730 A | 7/2009 |
| KR | 10-2010-0013924 A | 2/2010 |
| KR | 10-2012-0135611 A | 12/2012 |
| KR | 10-2013-0112631 A | 10/2013 |
| WO | WO 2013/149735 A1 | 10/2013 |

OTHER PUBLICATIONS

"Google Now," printed from the internet at <http://news.samsung.com/kr/3636>, Samsung, 2012, 6 pages.

Extended European Search Report dated Feb. 22, 2017 for European Application No. 16188194.1, 9 pages.

Office Action dated Nov. 15, 2016 for Korean Application No. 10-2016-7005936, 9 pages.

* cited by examiner

METHOD AND DEVICE FOR CALLING A TAXI

CROSS-REFERENCE TO RELATED APPLICATIONS

The present application is based upon and claims priority to Chinese Patent Application No. 201510727016.7 filed Oct. 30, 2015, the entire contents of which are incorporated herein by reference.

TECHNICAL FIELD

The present disclosure generally relates to the field of communication, and more particularly, to methods and devices for calling a taxi.

BACKGROUND

As various types of taxi calling software become more popular, people can, in addition to calling for a taxi in a customary manner, also call for a taxi through taxi calling software. However, existing taxi calling software is not ideal, because, for example, the whole taxi calling process may require user intervention and complex user operations, which may waste the user's time.

SUMMARY

According to a first aspect of embodiments of the present disclosure, there is provided a method for calling a taxi, which is applied in a terminal. The method may include determining, with the terminal, whether a user should call a taxi, based on at least one of schedule data or historical behavior data. The method may further include, when the terminal determines that the user should call a taxi, generating and outputting, with the terminal, a taxi calling order.

According to a second aspect of embodiments of the present disclosure, there is provided a device for calling a taxi. The device may include a processor and a memory for storing instructions executable by the processor. The processor may be configured to determine whether a user should call a taxi, based on at least one of schedule data or historical behavior data. The processor may be further configured to, when the processor determines that the user should call a taxi, generate and output a taxi calling order.

According to a third aspect of embodiments of the present disclosure, there is provided a non-transitory computer-readable storage medium having stored therein instructions configured to, when executed by a processor of a device, cause the device to call a taxi. The instructions may be configured to cause the device to determine whether a user should call a taxi, based on at least one of schedule data or historical behavior data. The instructions may be further configured to cause the device to, when the device determines that the user should call a taxi, generate and output a taxi calling order.

It is to be understood that both the foregoing general description and the following detailed description are exemplary and explanatory only and are not restrictive of the scope of the claims.

BRIEF DESCRIPTION OF THE DRAWINGS

The accompanying drawings, which are incorporated in and constitute a part of this specification, illustrate embodiments consistent with the disclosure and, together with the detailed description, serve to explain the principles of the disclosure.

DETAILED DESCRIPTION

Reference will now be made in detail to exemplary embodiments, examples of which are illustrated in the accompanying drawings. The following description refers to the accompanying drawings, in which the same reference numbers in different drawings represent the same or similar elements, unless otherwise not. The implementations set forth in the following description of exemplary embodiments do not represent all implementations consistent with the disclosure. Instead, they are merely examples of devices and methods consistent with aspects related to the disclosure and which may be recited in the appended claims.

Figure 1:
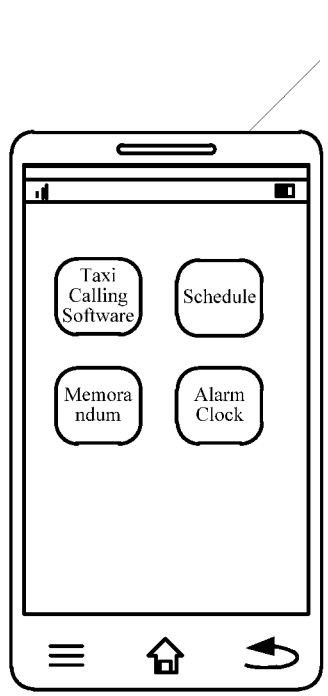
FIG. 1 is a schematic diagram of an application environment according to an exemplary embodiment.

To facilitate description of embodiments of the disclosure, an application environment of embodiments of the present disclosure will be first introduced. As shown in FIG. 1, an environment may include a terminal device 1, which may be loaded with, or otherwise have operative access to, software such as taxi calling software, a schedule, a memorandum, and an alarm clock. A user may use a taxi calling service through the taxi calling software, and may record his schedule on software such as the schedule, the memorandum, and the alarm clock.

Terminal device 1 may include, but is not limited to, a smart phone, a smart watch, or a tablet computer. Exemplary taxi calling software may be DIDI, UBER, and the like. The above type and number of devices and software are merely exemplary, and the present disclosure is not limited to those examples.

Figure 2:
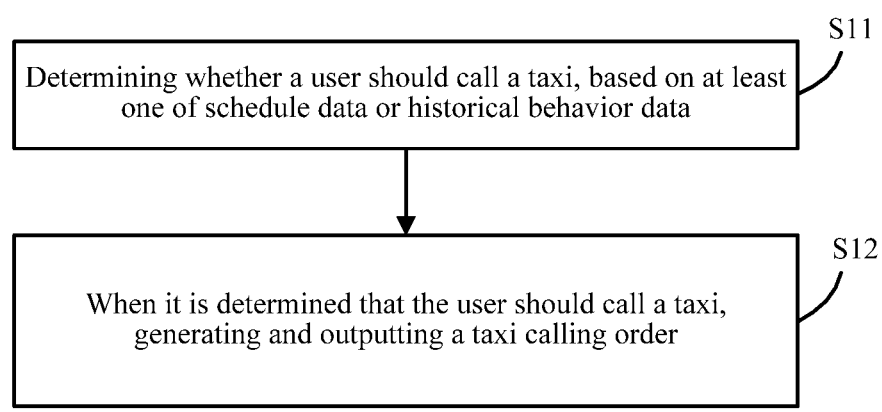
FIG. 2 is a flow chart illustrating a method for calling a taxi according to an exemplary embodiment.

FIG. 2 is a flow chart illustrating a method for calling a taxi according to an exemplary embodiment. A method may be performed by a terminal device in the above application environment. As shown in FIG. 2, a method may include the following steps.

In step S11, it is determined whether a user should call a taxi, based on at least one of schedule data or historical behavior data.

For example, based on a location where the user would usually be present and a time the user would usually arrive there, or based on a location where the user plans to be present and a time the user should arrive there, the terminal device may determine whether the user should call a taxi to arrive at the respective location at the respective time.

In step S12, when it is determined that the user should call a taxi, a taxi calling order is generated and outputted.

For example, when it is determined in step S11 that the user should call a taxi, in step S12, a taxi calling order may be pushed to the user, for the user to call a taxi.

In the present disclosure, a terminal device may automatically generate and output a taxi calling order when it determines that the user should call a taxi. Thus the terminal may initiate a taxi calling service as early as is possible, and may avoid delaying the schedule of the user. Moreover, a process may require no initiation and little or no intervention from the user. Thus, it may simplify user operation and save time for the user.

Figure 3:
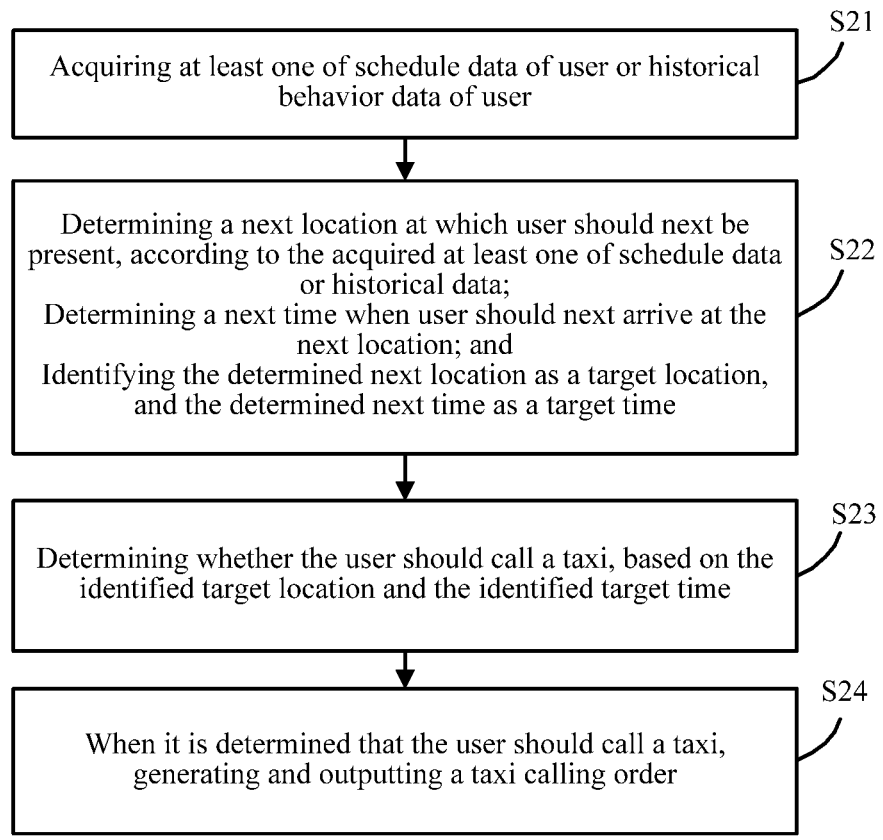
FIG. 3 is a flow chart illustrating a method for calling a taxi according to an exemplary embodiment.

FIG. 3 is a flow chart illustrating a method for calling a taxi according to an exemplary embodiment. A method may be performed by a terminal device in the above described application environment. As shown in FIG. 3, a method may include the following steps.

In step S21, at least one of historical behavior data or schedule data of the user is acquired.

Historical behavior data may for example contain a particular time and a location at which the user has been present at that particular time for a plurality of different instances of the particular time within a predetermined cycle. The predetermined cycle may be a week, a month or a year, etc. The predetermined cycle may be selected or entered by the user, or may be a system default cycle. The particular time may be selected or entered by the user, or may be a system default particular time. The particular time may be a particular repeated time period, such as a particular hour of the day, or a particular half hour of the day. So, for example, an example predetermined cycle may be a week, and historical behavior data may include a particular time that is the hour from 6:00-7:00. In this example, historical behavior data would then associate with that particular time a location, for example the user's office, at which the user had been present during the hour from 6:00-7:00 on five separate days in the predetermined cycle of a week.

Schedule data may for example contain a time, such as a future time, and a location at which the user plans to be present at the future time, as described further below.

Historical behavior data and schedule data may be acquired from the terminal device or a server, for example. In an implementation of a present embodiment, acquiring at least one of historical behavior data and schedule data of the user includes acquiring the historical behavior data of the user from a memory of the subject device or a server. An implementation of a present embodiment may additionally or alternatively include acquiring the schedule data of the user from one or more of a schedule, a memorandum, or an alarm clock, of the terminal or from the server.

For example, in daily life, a user might generally record his schedule for the coming days in the above software, in order to remind himself of upcoming events, etc. The specific content of this schedule data might generally include a location and a time, such as an upcoming meeting at the user's office at 11:00 on October 20.

In an implementation, the historical behavior data and the schedule data may be stored in the server, for the user to access these data with a plurality of different terminal devices. However, the historical behavior data and the schedule data may also be stored locally on the terminal, for the user to access these data on the terminal device. For example, the schedule data of the user may be stored in software such as the schedule, the memorandum, and the alarm clock of the terminal device. Thus, embodiments of the disclosure may be integrated with existing scheduling software, to facilitate the operation of the disclosure. For example, the taxi calling software may be configured to automatically or upon user command communicate with existing calendars, alarm clocks, schedules, etc. In some exemplary implementations, the taxi calling software may acquire schedule data through a predetermined message protocol or port. In some exemplary implementations, the existing calendars, alarm clocks, schedules, etc. may be configured to send schedule data to the taxi calling software through a predetermined message protocol or port when the schedule data is input by the user into the calendar, alarm clock, schedule, etc.

A method may further include generating the historical behavior data of the user, the historical behavior data of the user containing a recognized location and a time when the user arrives at the recognized location. The device may be configured to automatically generate historical behavior data periodically, or according to a command input by the user. A predetermined cycle for generating historical data may be pre-set as a system default, or entered by the user. Recognized locations may include, but are not limited to, spaces such as a home, an office, and a stadium.

In above implementations, by generating the historical behavior data of the user, it may be ensured that the terminal device can timely call a taxi for the user based on the historical behavior data.

In a present embodiment, generating historical behavior data of a user may include determining a location where the user has been present during a particular time period for several instances of that particular time period within a predetermined cycle, and then recording that location as a recognized location. The device may be configured to monitor the location of the device constantly, or periodically according to a pre-set cycle, on in a specific sub-period of a longer time period, or using a combination of these manners. For example, the device may be configured to monitor the device's location during every first week of a month, or from 6:00 to 9:30 and from 17:00 to 19:30 during each work day of a given time period, such as a month. Coordinates of the recognized location may be recorded by using a global positioning system (GPS) sensor. Generating historical behavior data of a user may further include recording a time at which the user arrives at that recognized location. A recognized location and time of arriving at the recognized location may be recorded multiple times, and average values may be saved as a result.

Historical behavior data of the user may also include a wake-up time of the user and a home-leaving time of the user. A time period between the wake-up time and the home-leaving time may be a time period needed by the user to get ready or prepare to leave the home, for example a time period for the user to clean himself and get dressed. A user may pre-configure wake-up time and home-leaving time, or the device may be configured to determine these times automatically. For example the device may determine wake-up time by using movement data from sensors in the device, wearable equipment, or in the house, or by using data from an alarm clock in the device. The device may determine a home-leaving time using GPS positioning data detected by the device or a similar system.

Because generating historical behavior data of the user involves privacy of the user, in embodiments, this step should be disclosed to the user and be performed after the user grants his permission. In an implementation, an option may be provided in a system setting menu of the mobile terminal for the user to select whether he grants permission for the terminal to generate historical behavior data.

Step S21 may, for example, be performed periodically. Additionally or alternatively, step S21 may be performed when the terminal device is moved or is wakened. After the step S21 is performed, the terminal device will proceed to subsequent steps.

In step S22, a next location at which the user should next be present is determined according to the acquired at least one of historical behavior data or schedule data, a next time at which the user should next arrive at the next location is determined, and the determined next location and the determined next time are respectively identified as a target location and a target time.

For example, the current time may be 8:00, the next location where the user should be present (according to the user's schedule data) may be the office, and the time when the user should arrive at the next location at which he should be present may be 8:30. Then, the office and the time 8:30 are respectively identified as a target location and a target time.

In step S23, it is determined whether the user should call a taxi based on the identified target location and the identified target time. Determining whether the user should call a taxi based on the target location and the target time may include the following sub-steps.

Sub-step One: determining a departure location and a departure time.

Sub-step One may include detecting variation data of a location of the user. Sub-step One may further include determining whether the user is in a state of remaining in place or in a state of taking public transportation, based on the detected variation data of the location of the user. Sub-step One may further include, when the user is determined to be in the state of remaining in place, identifying a current location of the user as the departure place. The device may be configured to monitor the current location during a time period preset as the system default value or preset by the user. The device may be configured to begin monitoring the current location around the start time and end time of a schedule. For example, the device may obtain information about a schedule, such as that an event starts at 7:00 and ends at 9:00, and implement monitoring during the time period from 6:50 to 7:20 and during the time period from 8:50 to 9:20. The device may be configured to use GPS positioning data, for example from the device, as the user's current location. Sub-step One may further include, when the user is determined to be in the state of taking public transportation, identifying a public transportation station as the departure place. The device may be configured to identify a particular public transportation station as the departure place according to schedule information or historical behavior date. For example, the device may access the user's schedule information, determine that the user has a conference scheduled in Shanghai on May 5, determine a closest train station to the conference, and identify that closest train station as being the departure place.

Variation data of a location of the user may refer to variation of the location of the user during a time period, and may be specifically represented by a motion trajectory of the user. For example, if the user moves within a small range (for example, several square meters) during a 1 minute period, it may be considered that the user is in a state of remaining in place. If the user moves a distance exceeding a predetermined value during a predetermined time period (for example, moves a distance exceeding 500 m within 1 minute), it may be considered that the user is in a state of taking public transportation. The device may be configured to begin monitoring variation data of a location of the user based upon the start time or end time of a scheduled event as discussed above. The device may be configured to set a user's location at the time the monitoring begins as an initial location from which variation is monitored.

In an implementation, the departure location and the departure time are thus determined based on variation data of the current location of the user. Thus, for example, the terminal not only can determine a departure location when the user stays in place, but also can determine a departure location when the user is currently taking a train, a plane, or the like.

Determining a departure time may further include, when the user is determined to be in the state of taking public transportation, identifying a time at which a public transportation device will arrive at the public transportation station as the departure time. For example, once the device determines that the user is in the state of taking public transportation, the device may determine which particular vehicle the user is on, for example by determining vehicle number based on where and when the user entered the state of taking public transportation. The device may then access a public transportation timetable from a server, and determine what time the determined vehicle will arrive at an appropriate departure location. The device may alternatively estimate a departure time based upon a determined route of the user to an appropriate departure location and traffic conditions on the route. Determining a departure time may alternatively or additionally include, when the user is determined to be in the state of remaining in place, identifying a current time as the departure time. Determining a departure location and a departure time may alternatively or additionally include, when the user is determined to be in the state of remaining in place, identifying a time equaling the current time plus a time period for the user to prepare to depart as the departure time. The time period for the user to prepare to depart may be preset as a system default value, or may be entered by the user, or may be learned based on historical behavior data.

For example, at 8:00, the terminal device may have been in a sleeping state for a long time period and the current time is morning. The terminal device may then detect at 8:00 that the user wakes up, by sensing motion with an integrated accelerometer. In this case, the departure time may be identified by the following calculation: the wake-up time (8:00)+a time period needed by the user to get ready to leave (30 minutes)=an identified departure time (8:30). The device may use a variety of algorithms to detect whether a user wakes up. For example, to detect that a user wakes up, the device may determine, based on the accelerometer data, that the current speed or distance of the device is greater than a preset value, and thus detect that the user has woken up, or determine that the speed or distance is not greater than a preset value, and thus detect that the user is still sleeping. The device may begin monitoring whether a user wakes up by beginning to monitor accelerometer data according to a time in a schedule or in an alarm clock of the device.

For another example, the user's work shift may end at 5:00 pm, and the terminal device may record that end-of-shift time of the user, along with the time period needed by the user to get ready or prepare for leaving after the end of his shift (for example 10 minutes). If for example the user has a schedule, an entry may then be included in the schedule, in which a departure location may be identified as the user's office, an end of work time may be identified as 5:00, and a departure time may be identified as 5:10. The device may be configured to use a variety of algorithms to categorize information from the schedule (e.g. determine information that is a location or a time), and to relate information that is determined to be a location to a location in the real world, including natural language understanding algorithms. In some implementations, a common departure time and location may be learned by the device according to monitored variations of the user's location during a specific time period.

Sub-step Two: deciding whether the user can arrive at the identified target location, by public transport means or on foot, within a time period from the determined departure time to the identified target time.

Sub-step Two may include using an off-line map (stored in the local device) or an on-line map (stored in a network server) to determine an amount of time period needed to arrive at the identified target location using public transportation or on foot. For example, the device may access its own map application or access a third-party map application using a predetermined message protocol or port and acquire an amount of time needed to arrive at the identified target location. Sub-step Two may further include, when the determined amount of time is larger than a difference between the determined departure time and the identified target time, deciding that the user cannot arrive at the identified target location, using public transportation or on foot, within the time period from the determined departure time to the identified target time. Otherwise, it can be decided that the user can arrive at the target location by public transport means or on foot.

Sub-step Three: determining that the user should call a taxi if the user cannot arrive at the identified target location, using public transportation or on foot, within the time period from the determined departure time to the identified target time.

In the above steps S21-S23, it may be determined whether the user should call a taxi. A next location at which the user should next be present is determined according to historical behavior data, such as daily behavior, or according to schedule data of the user. For example, the device may compare the current time with a similar time or times and associated locations in the historical behavior data of the user, or with a location associated with an upcoming time in the schedule data of the user, to determine a next location. It is determined whether the user should call a taxi based on the location at which the user should next be present and the time at which the user should arrive at that location. When the user should call a taxi, a method proceeds to step S24, to generate and output a taxi calling order. In an embodiment, the whole process may be performed in the background and require no user initiation and little or no user intervention. Moreover, only when the user cannot arrive in time at the identified target location by public transport means or on foot, will a taxi calling order be outputted. The method may thereby avoid frequently outputting unwanted taxi calling orders and disturbing the user.

In some embodiments, however, Sub-steps Two and Three may be omitted, and the taxi calling order may be generated when the next location at which the user should next be and the time the user should arrive at that location are identified. A detailed description of an example of implementation of such an embodiment is omitted herein, but may be apparent to one of skill in the art in view of this disclosure.

In step 24, when it is determined that the user should call a taxi, a taxi calling order is generated and outputted.

For example, the device may generate a message recognized within the network associated with the taxi calling software as being a request that a taxi be dispatched to the identified departure location for the identified departure time. A taxi calling order may contain the departure location and the target location. A taxi calling order may further contain the departure time. The terminal device may place an order a predetermined time in advance of the determined departure time, for example placing the order 5 minutes before the departure time.

For example, a taxi calling order may be generated soon after the user wakes up, and the departure time of a taxi calling order may be determined to be the time for the user to leave his home, which may be calculated by the terminal device. Alternatively, when the user is taking a train, the departure time may be determined to be the time when a train will arrive or should arrive at the station.

In an implementation, by determining a departure time, the terminal device may determine a time at which to place a taxi calling order to ensure that the user can arrive at the identified target location on time.

Generating and outputting a taxi calling order may include outputting taxi calling options for the user to select from, the taxi calling options containing an order confirmation option, an order modification option, and an order cancellation option. These taxi calling options may assist the user in completing or canceling the generated taxi calling order.

A method may further include acquiring or receiving a selection operation of the user. A taxi calling order may be displayed to the user on the device prior to being used to request a dispatch. The taxi calling order may include one or more selectable options, and the user may or may not input a selection of the one or more options. For example, if the user inputs a selection of an option, the value of that option when the order is used to request a dispatch is then set to the selection, and if the user does not input a selection of an option, the value of that option when the order is used to request a dispatch is set to the original value in the order. A method may further include, when the selection operation of the user selects the order confirmation option, sending a taxi calling order. A method may alternatively or additionally include, when the selection operation of the user selects the order modification option, receiving a departure location, a target location, or a departure time, which have been input by the user through the order modification option. A method may alternatively or additionally include, when the selection operation of the user selects the order cancellation option, deleting a taxi calling order.

A method may further include acquiring historical operation data of the user, the historical operation data of the user being data generated based on one or more operations previously performed by the user to generate a taxi calling order, with the historical operation data indicating historical operation performed by the user to process an order. A method may further include processing a taxi calling order based on the acquired historical operation data. Processing a taxi calling order may include confirming the order, cancelling the order, or modifying the order. For example, the device may record some or all selection operations made by the user. Selection operations may be recorded in association with the value of the option that the user selected or entered. When a taxi calling order is to be outputted, the device can then analyze the recorded history of user operations associated with output calling orders and recognize whether similar orders have been previously output. When there have been similar orders previously output, the device may use operations recorded in association with those similar orders to process the current order to be output. The device may determine whether one order is similar to another based on a similarity in their respective departure times and target locations.

For example, the user may be allowed two chances of being late to work every month, and thus on the first two mornings of every month, a generated taxi calling order with a departure location of the user's home and an intended target location of the user's office has always been cancelled by the user. The above user operation may be recorded in the historical operation data of the user. Then, when a taxi calling order is generated, and the taxi calling order is the first taxi calling order in the respective month that has a departure location of the user's home and an intended target location of the user's office, the taxi calling order may be automatically cancelled.

Methods provided by present embodiments will be illustrated with reference to examples as follows.

Example One. At 8:00, the terminal device determines that the next location the user would normally be at is the user's office, and that the user would normally arrive at 9:00, based on the historical behavior data of the user. The terminal device determines that the user cannot arrive at the office in 1 hour, using public transportation or on foot, based on the current location of the user and the location of the office. In response, the terminal device then automatically generates and outputs a taxi calling order, with the determined departure location being the current location of the user and the identified target location being the office.

Example Two. The user is scheduled to travel to attend a business meeting at 14:00. A train he is scheduled to take is scheduled to arrive at a train station at 13:00. However, at 13:00, the terminal device decides that the user has not yet arrived at the train station, and that the user will probably be late for the meeting if he travels by train. In response, the terminal device then automatically generates a taxi calling order customized to the actual situation, with the determined departure location being the train station, and the identified target location being the business meeting location.

An exemplary implementation of the disclosure may proceed as follows. First, the device acquires the user's schedule data by communicating with other software such as a calendar, memo, message inbox, etc. Second, the device determines the user's target location and target time, and a public transportation service the user will take to get to the target location, according to the acquired schedule data. Third, the device acquires routes and a timetable of the determined public transportation service from servers or other navigation applications. Fourth, the device monitors variation of the location of the user during a time period around a determined normal arrival time of a route of the public transportation service that, if taken by the user, would stop at a public transportation station in time to allow the user to reach the target location for the target time. Fifth, the device determines whether the user will be able to arrive at the target location for the target time using the public transportation service, based on the variation monitored in the fourth step. When the determination is yes, the device decides not to automatically output a taxi calling order. When the determination is no, the device sets the public transportation station as the departure location, and continually monitors variation of the location of the user until the user has arrived at the public transportation station. Then, when the variation of the location of the user indicates the user has arrived at the public transportation station, the device generates and outputs a taxi calling order from the public transportation station to the target location for the target time.

In the present disclosure, the terminal device may automatically generate and output a taxi calling order when it determines that the user should call a taxi. It may thereby initiate a taxi calling service as early as possible, thus avoiding delays to the schedule of the user. Moreover, a process may require no initiation and little or no intervention from the user. Thus, it may simplify user operation and save the user's time.

In the present disclosure, a target location at which the user would normally be next according to historical behavior data, or should be next according to the user's schedule, may be identified based on the at least one of historical behavior data or schedule data of the user. It may be determined whether the user should call a taxi to get there, based on the location at which the user should next be present and the time at which the user should arrive at that location. The whole process may be performed unobtrusively in the background by the terminal, and require no user initiation and little or no user intervention, thus avoiding user operations and saving the user's time.

In the present disclosure, historical behavior data and schedule data of the user may be acquired from the local terminal, or may be acquired over a network. It may be selected in various forms based on the user's preference. In addition, the schedule data may be specifically acquired from one or more of the schedule, the memo, and the alarm clock. Thus, solutions of this disclosure can be integrated with existing software, to facilitate the operation of this disclosure.

In the present disclosure, it may be decided whether the user can arrive at the identified target location, by public transport means or on foot, within a time period from the determined departure time to identified the target time. Based on this decision, the method may determine whether the user should call a taxi. The deciding solution is easy to implement, compatible with real-life situations, and thus has a high applicability.

In the present disclosure, a departure location and a departure time may be determined based on variation data of a current location of the user. Thus the method not only may determine a departure location when the user stays in place, but also may determine a departure location when the user is currently taking a train, a plane, or the like.

In the present disclosure, a departure time may be determined according to different states (such as currently taking public transportation, or remaining in place) of the user. Therefore, the departure time determination result may be more accurate.

In the present disclosure, deciding whether the user can arrive at the identified target location, by public transportation or on foot, within a time period from the departure time to the target time, may be implemented through an off-line map or an on-line map, which allows for easy implementation.

In the present disclosure, a taxi calling order may automatically include a departure location, a target location, or the like. Therefore, it may eliminate the need for user input.

In the present disclosure, a taxi calling order may also include a departure time. By providing a departure time, the terminal device may determine a time to place an order to ensure that the user may arrive at the identified target location on time.

In the present disclosure, historical behavior data of the user may be generated, to ensure that the terminal device may timely call a taxi for the user according to the historical behavior data of the user.

In the present disclosure, when a taxi calling order is outputted, taxi calling options may be outputted for the user to select from. A taxi calling option may contain an order confirmation option, an order modification option, and an order cancellation option. Then, the user may confirm, modify, and cancel the order based on the contents of the order. The method may thereby ensure the accuracy of the order.

In the present disclosure, a taxi calling order may be directly processed based on historical operation data of the user. This may avoid the confirming or modifying operations for the user, and thus save the user's time.

Figure 4:
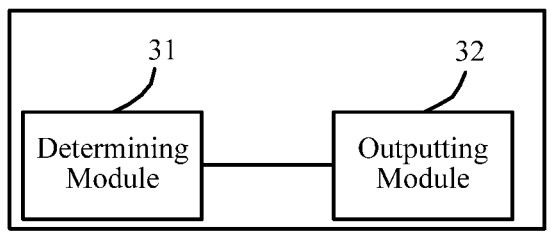
FIG. 4 is a block diagram of a device for calling a taxi according to an exemplary embodiment.

FIG. 4 is a block diagram of a device for calling a taxi according to an exemplary embodiment. A device for calling a taxi may be the above terminal device or may be integrated in the terminal device. As shown in FIG. 4, a device includes a determining module 31 configured to determine whether a user should call a taxi, based on at least one of schedule data or historical behavior data. The device may further include an outputting module 32 configured to, when determining module 31 determines that the user should call a taxi, generate and output a taxi calling order.

In the present disclosure, the device may automatically generate and output a taxi calling order when it determines that the user should call a taxi. It may thereby initiate a taxi calling service as early as possible, and may thus avoid delaying the schedule of the user. Moreover, a process may require no initiation and little or no intervention from the user. Thus, it may simplify user operation and save the user's time.

Figure 5:
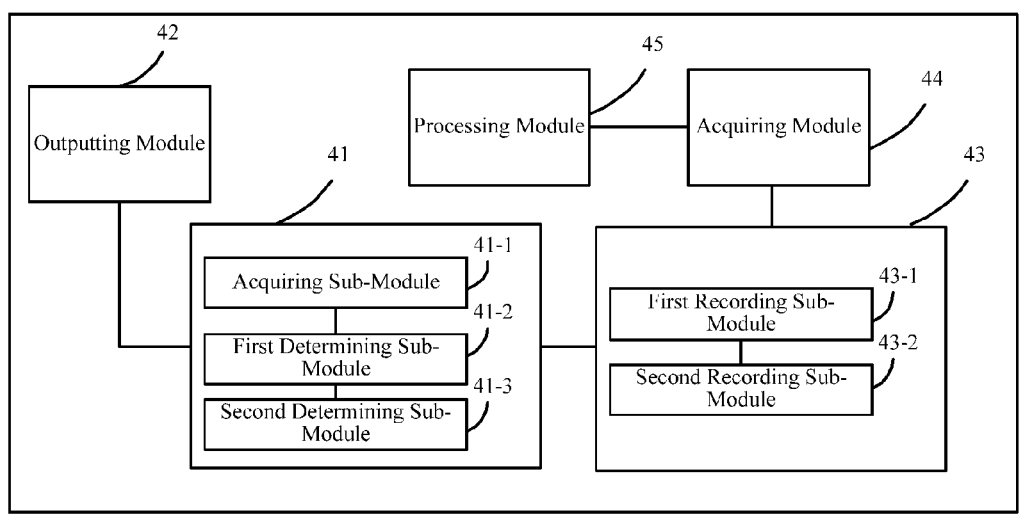
FIG. 5 is a block diagram of a device for calling a taxi according to an exemplary embodiment.

FIG. 5 is a block diagram of a device for calling a taxi according to an exemplary embodiment. A device for calling a taxi may be the above terminal device or may be integrated in the terminal device. As shown in FIG. 5, a device includes a determining module 41 configured to determine whether a user should call a taxi, based on at least one of schedule data or historical behavior data. The device may further include an outputting module 42 configured to, when the determining module 41 determines that the user should call a taxi, generate and output a taxi calling order.

Determining module 41 includes may include an acquiring sub-module 41-1 configured to acquire at least one of schedule data or historical behavior data of the user. Historical behavior data of the user may contain a particular time and a location at which the user has been present during the particular time for a plurality of different instances of the particular time within a predetermined cycle. Schedule data may contain a time and a location at which the user plans to be present during the time.

Determining module 41 may further include a first determining sub-module 41-2 configured to determine a next location where the user should be present, according to the acquired historical behavior data or schedule data. Determining module 41-2 may be further configured to determine a next time at which the user should arrive at the next location, according to the acquired historical behavior data or schedule data. Determining module 41-2 may be further configured to identify the next location and the next time as a target location and a target time.

Determining module 41 may further include a second determining sub-module 413 configured to determine whether the user should call a taxi, based on the identified target location and the identified target time.

A predetermined cycle may be a week, a month or a year, etc. A predetermined cycle may be set by the user, or may be a system default cycle. A particular time may be set by the user, or may be a system default cycle, and may be a time period that repeats periodically, such as a particular hour of the day, or a particular half hour of the day.

Historical behavior data and schedule data may be acquired from a terminal device (e.g. the above terminal device) or from a server.

In an implementation of the present embodiment, the acquiring sub-module 41-1 is configured to acquire the historical behavior data of the user from a memory of the device or from a server, and to acquire the schedule data of the user from a schedule, a memorandum, and an alarm clock, of the device or of the server.

For example, in daily life, the user might generally record his schedule for the coming days in the above software, in order to remind himself of upcoming events. The specific content may generally include a location and a time, such as a meeting at the user's office at 11:00 on October 20.

In an implementation, the historical behavior data and the schedule data may be stored in the server, for the user to access these data with different devices. However, the historical behavior data and the schedule data may also be stored locally, for the user to use these data on the device. Specifically, the schedule data of the user may be stored in software such as a schedule, a memorandum and an alarm clock of the subject device. Thus, a solution of the disclosure may be integrated with existing software, to facilitate operation of disclosed embodiments.

Acquiring sub-module 41-1 may perform the above operations periodically, or when the device is moved or is wakened.

In a present embodiment, a second determining sub-module 41-3 is configured to determine a departure location and a departure time. Second determining sub-module 41-3 may be further configured to decide whether the user can arrive at the identified target location, using public transportation or on foot, within a time period from the determined departure time to the identified target time. Second determining sub-module 41-3 may be further configured to determine that the user should call a taxi when the decision is that the user cannot arrive at the target location, using public transportation or on foot, within the time period from the determined departure time to the identified target time.

The second determining sub-module 41-3 may be configured to detect variation data of a location of the user and determine whether the user is in a state of remaining in place or in a state of taking public transportation, based on the detected variation data of the location of the user. To determine the departure location, the second determining module 41-3 may be configured to, when the user is in the state of remaining in place, identify a current location of the user as the departure location. To determine the departure location, the second determining module 41-3 may be further configured to, when the user is in the state of taking a public transport means, identify a public transportation station as the departure location.

Variation data of a location of the user may refer to variation of the location of the user during a time period, and may be specifically represented by a motion trajectory of the user. For example, if the user moves within a small range (for example, several square meters) during a 1 minute period, it may be considered that the user is in a state of remaining in place. If the user moves a distance exceeding a predetermined value during a predetermined time period (for example, moves a distance exceeding 500 m within 1 minute), it may be considered that the user is in a state of taking public transportation.

In an implementation, the departure location and the departure time are determined based on variation data of the current location of the user. The device may thereby not only determine a departure location when the user stays in place, but also may determine a departure location when the user is currently taking a train, a plane, or the like.

To determine the departure time, the second determining sub-module 41-3 may be further configured to, when the user is currently in the state of taking public transportation, identify a time when a public transport means arrives at the terminal station as the departure time. To determine the departure time, the second determining sub-module 41-3 may be further configured to, when the user is in the state of remaining in place, identify a current time as the departure time. To determine the departure time, the second determining sub-module 41-3 may be further configured to, identify a time equaling the current time plus a time period for the user to prepare to depart as the departure time.

For example, at 8:00, the terminal device may have been in a sleeping state for a long time period and the current time is morning. The terminal device may then detect at 8:00 that the user wakes up, by sensing motion with an integrated accelerometer. In this case, the departure time may be identified by the following calculation: the wake-up time (8:00)+a time period needed by the user to get ready to leave (30 minutes)=an identified departure time (8:30).

For another example, the user's work shift may end at 5:00 pm, and the terminal device may record that end-of-shift time of the user, along with the time period needed by the user to get ready or prepare for leaving after the end of his shift (for example 10 minutes). If for example the user has a schedule, an entry may then be included in the schedule in which a departure location may be identified as the user's office, and a departure time may be identified as 5:10.

To decide whether the user can arrive at the identified target location, by public transportation or on foot, within a time period from the determined departure time to the identified target time, the second determining sub-module 41-3 may be configured to use an off-line map (stored in the local device) or an on-line map (stored in a network server) to determine an amount of time needed to arrive at the target location using public transportation or on foot. To decide whether the user can arrive at the identified target location, by public transportation or on foot, within a time period from the determined departure time to the identified target time, the second determining sub-module 41-3 may be further configured to, when the determined amount of time is larger than a difference between the determined departure time and the identified target time, decide that the user cannot arrive at the target location, using public transportation or on foot, within the time period from the determined departure time to the identified target time. The second determining sub-module 41-3 may be configured to otherwise decide that the user can arrive at the target location, using public transportation or on foot, within the time period from the determined departure time to the identified target time.

In a present embodiment, a taxi calling order contains the determined departure location and the identified target location.

In a present embodiment, a taxi calling order further contains the determined departure time. The device may be configured to place an order in advance, based on the determined departure time, for example by placing an order 5 minutes before the determined departure time.

For example, a taxi calling order is generated soon after the user gets up, and the departure time of a taxi calling order is a time for the user to leave his home which is calculated by the device. Alternatively, when the user is taking a train, the departure time may be a time when the train arrives at a station.

In an implementation, by providing a determined departure time, the device may determine a time to place a taxi calling order to ensure that the user can arrive at the identified target location by the identified target time.

The device may further include a generating module 43 configured to generate the historical behavior data of the user, the historical behavior data of the user containing a recognized location and a time at which the user arrives at the recognized location A recognized location may include, but is not limited to, spaces such as a home, an office, a stadium, and the like.

Generating module 43 may include a first recording sub-module 43-1 configured to record a location at which the user has been present during a particular time for a plurality of different instances of the particular time within a predetermined cycle, and recording the determined location as the recognized location. Coordinates of the recognized location may be recorded, for example, with a GPS sensor. Generating module 43 may further include a second recording sub-module 43-2 configured to record a time at which the user arrives at the recognized location.

In the above description, it is described how the generating module 43 records a recognized location and a time at which the user usually arrives at the recognized location. Specifically, the generating module 43 may be configured to record the recognized location and the time at which the user arrives at the recognized location multiple times, and may save an average value as a result.

Historical behavior data of the user may also include a wake-up time of the user and a home-leaving time of the user. An amount of time between the wake-up time and the home-leaving time may be set to be an amount of time needed by the user to prepare to leave, for example the amount of time needed for the user to clean himself and get dressed.

In above implementations, by generating the historical behavior data of the user, it may be ensured that the device can timely call a taxi for the user based on the historical behavior data.

Because generating historical behavior data of the user involves privacy of the user, this step may be disclosed to the user, and be performed after the user grants permission. In an implementation, an option may be provided in a system setting menu of the mobile terminal for the user to select whether or not to grant permission for generation of historical behavior data.

In a present embodiment, the outputting module 42 may be configured to output taxi calling options for the user to select therefrom, the outputted taxi calling options containing an order confirmation option, an order modification option, and an order cancellation option A device may further include an acquiring module 44 configured to acquire a selection operation of the user. A device may further include a processing module 45 configured to, when the selection operation of the user selects the order confirmation option, send a taxi calling order. Processing module 45 may be further configured to, when the selection operation of the user selects the order modification option, receive a departure location, a target location, or a departure time, input by the user through the order modification option. Processing module 45 may be further configured to, when the selection operation of the user selects the order cancellation option, delete the taxi calling order.

Acquiring module 44 may be configured to acquire historical operation data of the user, the historical operation data of the user being data generated based on one or more operations previously performed by the user to generate a taxi calling order, with the historical operation data indicating historical selection operations performed by the user to process a generated taxi calling order. Processing module 45 may be configured to process a taxi calling order based on the acquired historical operation data.

For example, the user may be allowed two chances of being late to work every month, and thus on the first two mornings of every month, a taxi calling order with a departure location of the user's home and an intended target location of the user's office has always been cancelled by the user. The above user operation may be recorded in the historical operation data of the user. Then, when a taxi calling order is generated, and the taxi calling order is the first taxi calling order in the respective month that has a departure location of the user's home and an intended target location of the user's office, the device may be configured to automatically cancel the taxi calling order.

In the present disclosure, a device may automatically generate and output a taxi calling order when the device determines that the user should call a taxi. The device may thereby initiate a taxi calling service as early as possible, and may thus avoid delaying the user's schedule. Moreover, a process may require no initiation and little or no intervention from the user. Thus, the device may simplify user operation and save the user's time.

With respect to the devices in the above embodiments, the specific manners for performing operations for individual modules therein have been described in detail in the embodiments regarding the relevant methods, and will not be elaborated again herein.

Figure 6:
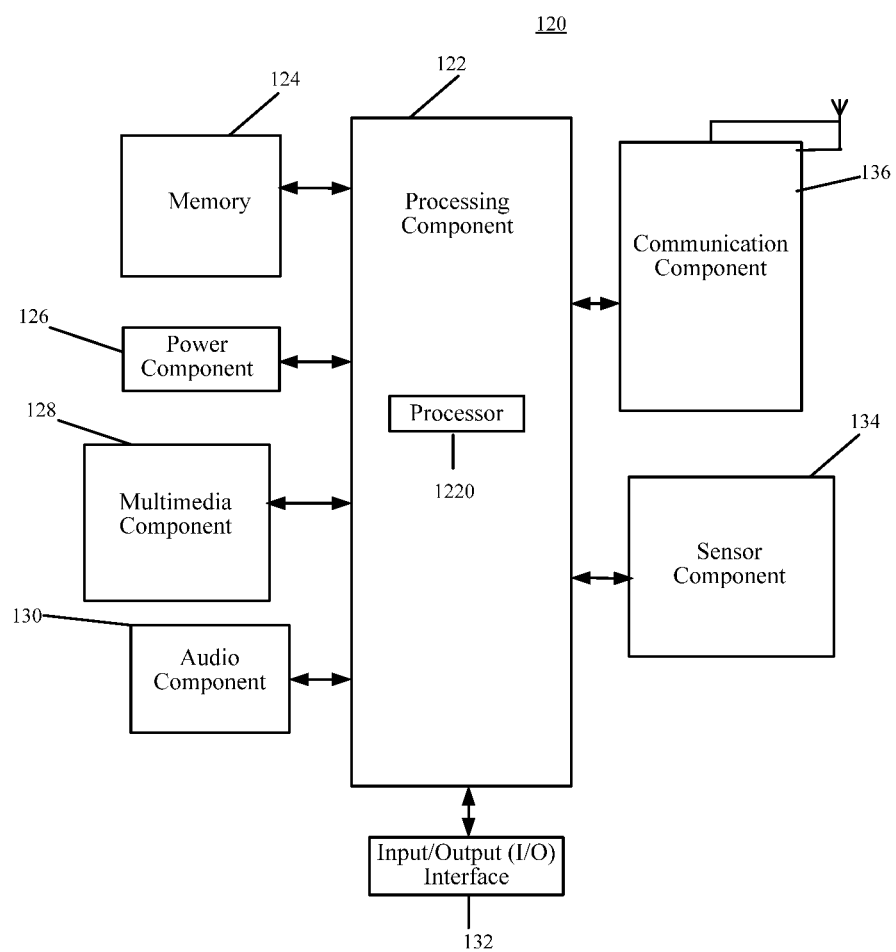
FIG. 6 is a block diagram of a device for calling a taxi according to an exemplary embodiment.

FIG. 6 is a block diagram of a device 120 for calling a taxi according to an exemplary embodiment. For example, the device 120 may be mobile terminal (such as a smart phone). Device 120 may be an embodiment of terminal device 1 or other terminal devices discussed throughout this disclosure.

The device 120 may include one or more of the following components: a processing component 122, a memory 124, a power component 126, a multimedia component 128, an audio component 130, an input/output (I/O) interface 132, a sensor component 134, and a communication component 136.

The processing component 122 typically controls overall operations of the device 120, such as the operations associated with display, telephone calls, data communications, camera operations, and recording operations. The processing component 122 may include one or more processors 1220 to execute instructions to perform all or part of the steps in the above described methods. Moreover, the processing component 122 may include one or more modules which facilitate the interaction between the processing component 122 and other components. For instance, the processing component 122 may include a multimedia module to facilitate the interaction between the multimedia component 128 and the processing component 122. Processing component 122 may include any or all of the modules or sub-modules discussed above, including determining module 31, outputting module 32, determining module 41, acquiring sub-module 41-1, first determining sub-module 41-2, second determining sub-module 41-3, outputting module 42, generating module 43, first recording sub-module 43-1, second recording sub-module 43-2, acquiring module 44, or processing module 45.

The memory 124 is configured to store various types of data to support the operation of the device 120. Examples of such data include instructions for any applications or methods operated on the device 120, contact data, phonebook data, messages, pictures, video, etc. The memory 124 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 126 provides power to various components of the device 120. The power component 126 may include a power management system, one or more power sources, and any other components associated with the generation, management, and distribution of power in the device 120.

The multimedia component 128 includes a screen providing an output interface between the device 120 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 128 includes a front camera and/or a rear camera. The front camera and the rear camera may receive an external multimedia datum while the device 120 is in an operation mode, such as a photographing mode or a video mode. Each of the front camera and the rear camera may be a fixed optical lens system or have focus and optical zoom capability.

The audio component 130 is configured to output and/or input audio signals. For example, the audio component 130 includes a microphone ("MIC") configured to receive an external audio signal when the device 120 is in an operation mode, such as a call mode, a recording mode, and a voice recognition mode. The received audio signal may be further stored in the memory 124 or transmitted via the communication component 136. In some embodiments, the audio component 130 further includes a speaker to output audio signals.

The I/O interface 132 provides an interface between the processing component 122 and peripheral interface modules, such as a keyboard, a click wheel, buttons, and the like. The buttons may include, but are not limited to, a home button, a volume button, a starting button, and a locking button.

The sensor component 134 includes one or more sensors to provide status assessments of various aspects of the device 120. For instance, the sensor component 134 may detect an open/closed status of the device 120, relative positioning of components, e.g., the display and the keypad, of the device 120, a change in position of the device 120 or a component of the device 120, a presence or absence of user contact with the device 120, an orientation or an acceleration/deceleration of the device 120, and a change in temperature of the device 120. The sensor component 134 may include a proximity sensor configured to detect the presence of nearby objects without any physical contact. The sensor component 134 may also include a light sensor, such as a CMOS or CCD image sensor, for use in imaging applications. In some embodiments, the sensor component 134 may also include an accelerometer sensor, a gyroscope sensor, a magnetic sensor, a pressure sensor, or a temperature sensor.

The communication component 136 is configured to facilitate communication, wired or wirelessly, between the device 120 and other devices. The device 120 may access a wireless network based on a communication standard, such as WiFi, 2G, or 3G, or a combination thereof. In one exemplary embodiment, the communication component 136 receives a broadcast signal or broadcast associated information from an external broadcast management system via a broadcast channel. In one exemplary embodiment, the communication component 136 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 120 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 124, executable by the processor 1220 in the device 120, for performing the above-described methods. For example, the non-transitory computer-readable storage medium may be a ROM, a RAM, a CD-ROM, a magnetic tape, a floppy disc, an optical data storage device, and the like.

An embodiment of a non-transitory computer readable storage medium stores instructions in the storage medium, which when executed by a processor of a device cause the device to perform a method for calling a taxi. The instructions may be configured to cause the device to determine whether a user should call a taxi, based on at least one of schedule data or historical behavior data. The instructions may be further configured to cause the device to, when the device determines that the user should call a taxi, generate and output a taxi calling order. The instructions may be further configured to cause the device to perform any or all of the steps of the methods discussed above, as described above, including steps S11, S12, S21, S22, S23, and S24.

The methods, devices, and modules described above may be implemented in many different ways and as hardware, software or in different combinations of hardware and software. For example, all or parts of the implementations may be a processing circuitry that includes an instruction processor, such as a central processing unit (CPU), micro-controller, a microprocessor; or application specific integrated circuits (ASICs), digital signal processors (DSPs), digital signal processing devices (DSPDs), programmable logic devices (PLDs), field programmable gate arrays (FPGAs), controllers, micro-controllers, microprocessors, other electronic components; or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Each module or sub-module discussed above, such as the determining module 31, outputting module 32, determining module 41, acquiring sub-module 41-1, first determining sub-module 41-2, second determining sub-module 41-3, outputting module 42, generating module 43, first recording sub-module 43-1, second recording sub-module 43-2, acquiring module 44, or processing module 45, may take the form of a packaged functional hardware unit designed for use with other components, a portion of a program code (e.g., software or firmware) executable by the processor 1220 or the processing circuitry that usually performs a particular function of related functions, or a self-contained hardware or software component that interfaces with a larger system, for example.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

Other embodiments of the disclosure will be apparent to those skilled in the art from consideration of the specification and practice of the this disclosure. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for calling a taxi, which is applied in a terminal, the method comprising:
   determining, with the terminal, whether a user should call a taxi, based on at least one of schedule data or historical behavior data; and
   when the terminal determines that the user should call a taxi, generating and outputting, with the terminal, a taxi calling order;

wherein determining whether the user should call a taxi, based on the at least one of schedule data or historical data, comprises:
  acquiring at least one of schedule data of the user or historical behavior data of the user, wherein schedule data of the user contains a time and a location at which the user plans to be present during the time, and wherein historical behavior data of the user contains a particular time and a location at which the user has been present during the particular time for a plurality of different instances of the particular time within a predetermined cycle;
  determining a next location at which the user should be present, according to the acquired at least one of schedule data of the user or historical behavior data of the user;
  determining a next time at which the user should arrive at the next location, according to the acquired at least one of schedule data of the user or historical behavior data of the user;
  identifying the determined next location as a target location and the determined next time as a target time; and
  determining whether the user should call a taxi, based on the identified target location and the identified target time.

2. The method of claim 1, wherein acquiring the at least one of schedule data of the user or historical behavior data of the user comprises at least one of:
  acquiring historical behavior data of the user from a memory of the terminal or from a server; or
  acquiring schedule data of the user from a schedule, a memorandum, or an alarm clock, of the terminal or of a server.

3. The method of claim 1, wherein determining whether the user should call a taxi, based on the identified target location and the identified target time, comprises:
  determining a departure location and a departure time;
  deciding whether the user can arrive at the identified target location, using public transportation or on foot, within a time period from the determined departure time to the identified target time; and
  determining that the user should call a taxi when the decision is that the user cannot arrive at the identified target location, using public transportation or on foot, within the time period from the determined departure time to the identified target time.

4. The method of claim 3, wherein determining the departure location and the departure time comprises:
  detecting variation data of a location of the user;
  determining whether the user is in a state of remaining in place or in a state of taking public transportation, based on the detected variation data of the location of the user; and
  at least one of:
    when the user is determined to be in the state of remaining in place, identifying a current location of the user as the departure location; or
    when the user is determined to be in the state of taking public transportation, identifying a public transportation station as the departure location.

5. The method of claim 4, wherein determining the departure location and the departure time further comprises at least one of:
  when the user is determined to be in the state of taking public transportation, identifying a time at which a public transportation device will arrive at the public transportation station as the departure time;
  when the user is determined to be in the state of remaining in place, identifying a current time as the departure time; or
  when the user is determined to be in the state of remaining in place, identifying a time equaling the current time plus a time period for the user to prepare to depart as the departure time.

6. The method of claim 3, wherein deciding whether the user can arrive at the identified target location, using public transportation or on foot, within the time period from the determined departure time to the identified target time, comprises:
  using an off-line map or an on-line map to determine an amount of time needed to arrive at the identified target location using public transportation or on foot; and
  when the determined amount of time is larger than a difference between the determined departure time and the identified target time, deciding that the user cannot arrive at the identified target location, using public transportation or on foot, within the time period from the determined departure time to the identified target time.

7. The method of claim 1, wherein the taxi calling order contains the determined departure location and the identified target location.

8. The method of claim 7, wherein the taxi calling order further contains the determined departure time.

9. The method of claim 1, wherein the method further comprises:
  generating the historical behavior data of the user, the historical behavior data of the user containing a recognized location and a time at which the user arrives at the recognized location.

10. The method of claim 9, wherein generating the historical behavior data of the user comprises:
  determining a location at which the user has been present during a particular time for a plurality of different instances of the particular time within a predetermined cycle, and recording the determined location as the recognized location; and
  recording a time at which the user arrives at the recognized location.

11. The method of claim 1, wherein generating and outputting the taxi calling order comprises:
  outputting taxi calling options for the user to select from, the taxi calling options containing an order confirmation option, an order modification option, and an order cancellation option.

12. The method of claim 11, wherein the method further comprises:
  receiving a selection operation of the user; and
  at least one of:
    when the selection operation of the user selects the order confirmation option, sending the taxi calling order;
    when the selection operation of the user selects the order modification option, receiving a departure location, a target option, or a departure time, input by the user through the order modification option; or
    when the selection operation of the user selects the order cancellation option, deleting the taxi calling order.

13. The method of claim 1, wherein the method further comprises:
  acquiring historical operation data of the user, the historical operation data of the user being data generated based on one or more operations previously performed by the user to generate a taxi calling order; and
  processing a taxi calling order based on the acquired historical operation data.

14. A device for calling a taxi, the device comprising:
a processor; and
a memory for storing instructions executable by the processor;
wherein the processor is configured to:
  determine whether a user should call a taxi, based on at least one of schedule data or historical behavior data; and
  when the processor determines that the user should call a taxi, generate and output a taxi calling order; and
wherein to determine whether a user should call a taxi, based on at least one of schedule data or historical behavior data, the processor is configured to:
  acquire at least one of schedule data of the user or historical behavior data of the user, wherein schedule data contains a time and a location at which the user plans to be present during the time, and wherein historical behavior data contains a particular time and location at which the user has been present during the particular time for a plurality of different instances of the particular time within a predetermined cycle;
  determine a next location at which the user should be present, according to the acquired at least one of schedule data or historical behavior data;
  determine a next time at which the user should arrive at the next location, according to the acquired at least one of schedule data or historical behavior data;
  identify the determined next location as a target location and the determined next time as a target time; and
  determine whether the user should call a taxi, based on the identified target location and the identified target time.

15. The device of claim 14, wherein the processor is further configured to at least one of:
  acquire historical behavior data of the user from a memory of the device or from a server; or
  acquire schedule data of the user from a schedule, a memorandum, or an alarm clock, of the device or of a server.

16. The device of claim 4, wherein the processor is further configured to:
  determine a departure location and a departure time;
  decide whether the user can arrive at the identified target location, using public transportation or on foot, within a time period from the determined departure time to the identified target time; and
  determine that the user should call a taxi when the decision is that the user cannot arrive at the identified target location, using public transportation or on foot, within the time period from the determined departure time to the identified target time.

17. The device of claim 16, wherein the processor is further configured to:
  detect variation data of a location of the user;
  determine whether the user is in a state of remaining in place or in a state of taking public transportation, based on the detected variation data of the location of the user; and
  at least one of:
    when the user is determined to be in a state of remaining in place, identify a location of the user as the departure location; or
    when the user is determined to be in a state of taking public transportation, identify a public transportation station as the departure location.

18. A non-transitory computer-readable storage medium having stored therein instructions configured to, when executed by a processor of a device, cause the device to:
  determine whether a user should call a taxi, based on at least one of schedule data or historical behavior data; and
  when the device determines that the user should call a taxi, generate and output a taxi calling order;
  wherein to cause the device to determine whether a user should call a taxi, based on at least one of schedule data or historical data, the instructions are configured to, when executed by the processor of a device, cause the device to:
    acquire at least one of schedule data of the user or historical behavior data of the user, wherein schedule data contains a time and a location at which the user plans to be present during the time, and wherein historical behavior data contains a particular time and location at which the user has been present during the particular time for a plurality of different instances of the particular time within a predetermined cycle;
    determine a next location at which the user should be present, according to the acquired at least one of schedule data or historical behavior data;
    determine a next time at which the user should arrive at the next location, according to the acquired at least one of schedule data or historical behavior data;
    identify the determined next location as a target location and the determined next time as a target time; and
    determine whether the user should call a taxi, based on the identified target location and the identified target time.

19. The non-transitory computer-readable storage medium of claim 18, wherein the instructions are further configured to, when executed by the processor of a device, cause the device to:
  determine a departure location and a departure time;
  decide whether the user can arrive at the identified target location, using public transportation or on foot, within a time period from the determined departure time to the identified target time; and
  determine that the user should call a taxi when the decision is that the user cannot arrive at the identified target location, using public transportation or on foot, within the time period from the determined departure time to the identified target time.

20. The non-transitory computer-readable storage medium of claim 19, wherein the instructions are further configured to, when executed by the processor of a device, cause the device to:
  detect variation data of a location of the user;
  determine whether the user is in a state of remaining in place or in a state of taking public transportation, based on the detected variation data of the location of the user; and
  at least one of:
    when the user is determined to be in a state of remaining in place, identify a location of the user as the departure location; or when the user is determined to be in a state of taking public transportation, identify a public transportation station as the departure location.

* * * * *